(12) United States Patent
Katou

(10) Patent No.: US 12,325,134 B2
(45) Date of Patent: Jun. 10, 2025

(54) ROBOT CONTROL DEVICE AND ROBOT SYSTEM

(71) Applicant: FANUC CORPORATION, Yamanashi (JP)

(72) Inventor: Tomoki Katou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 199 days.

(21) Appl. No.: 17/999,036

(22) PCT Filed: May 13, 2021

(86) PCT No.: PCT/JP2021/018279
§ 371 (c)(1),
(2) Date: Nov. 16, 2022

(87) PCT Pub. No.: WO2021/235324
PCT Pub. Date: Nov. 25, 2021

(65) Prior Publication Data
US 2023/0219224 A1 Jul. 13, 2023

(30) Foreign Application Priority Data

May 18, 2020 (JP) ................................ 2020-086924

(51) Int. Cl.
*B25J 9/16* (2006.01)
*G05B 19/414* (2006.01)

(52) U.S. Cl.
CPC ............ *B25J 9/1664* (2013.01); *B25J 9/161* (2013.01); *G05B 19/414* (2013.01)

(58) Field of Classification Search
CPC ........ B25J 9/1664; B25J 9/161; B25J 9/1602; B25J 9/1656; G05B 19/414

USPC ................. 700/245–264; 318/568.11–568.25
See application file for complete search history.

(56) References Cited

U.S. PATENT DOCUMENTS

| | | | | |
|---|---|---|---|---|
| 6,161,051 A | * | 12/2000 | Hafemann | G06F 8/44 700/86 |
| 6,275,741 B1 | * | 8/2001 | Choi | G05B 19/414 700/200 |
| 6,330,495 B1 | * | 12/2001 | Kaneko | B25J 9/1671 700/264 |
| 6,684,264 B1 | * | 1/2004 | Choi | G06F 3/0481 700/204 |
| 6,718,231 B2 | * | 4/2004 | Konno | G05B 19/0426 446/268 |

(Continued)

FOREIGN PATENT DOCUMENTS

| CN | 102862162 A | 1/2013 |
|---|---|---|
| CN | 108000517 A | 5/2018 |

(Continued)

*Primary Examiner* — Jaime Figueroa
(74) *Attorney, Agent, or Firm* — HAUPTMAN HAM, LLP

(57) ABSTRACT

Provided is a robot control device that makes it possible to perform high-level operations on a robot from an external device. The robot control device for controlling a robot, includes: a digital input/output interface for transmitting/receiving digital data to/from an external device; a program generation unit which generates an action command for the robot in accordance with command identification data included in digital data inputted via the digital input/output interface; and a program execution unit which executes the generated action command.

8 Claims, 5 Drawing Sheets

(56) References Cited

U.S. PATENT DOCUMENTS

| | | | |
|---|---|---|---|
| 7,096,090 B1* | 8/2006 | Zweig | G05D 1/0022 700/249 |
| 7,129,664 B2* | 10/2006 | Kubo | G05B 19/4155 700/250 |
| 7,282,882 B2* | 10/2007 | Kitatsuji | G05B 19/414 901/6 |
| 7,525,274 B2* | 4/2009 | Kazi | G05B 19/4185 318/587 |
| 8,473,202 B2* | 6/2013 | Lapham | G06F 30/00 455/418 |
| 8,594,814 B2* | 11/2013 | Rovaglio | G06F 3/011 715/848 |
| 8,761,932 B2* | 6/2014 | Lapham | G06F 30/00 901/41 |
| 9,056,396 B1* | 6/2015 | Linnell | B25J 9/1664 |
| 9,242,372 B2* | 1/2016 | Laurent | G05B 19/409 |
| 9,746,845 B2* | 8/2017 | Ono | G05B 19/052 |
| 10,031,500 B1* | 7/2018 | Diaz | G05B 19/042 |
| 10,057,593 B2* | 8/2018 | Richert | G06T 7/579 |
| 10,089,586 B2* | 10/2018 | Vestal | G06Q 10/063114 |
| 10,209,696 B2* | 2/2019 | Fujita | G05B 19/05 |
| 10,274,923 B2* | 4/2019 | Nishiyama | G05B 19/056 |
| 10,303,143 B2* | 5/2019 | Hatanaka | G05B 19/0421 |
| 10,649,643 B2* | 5/2020 | Roper | B25J 9/1671 |
| 10,860,010 B2* | 12/2020 | Shimakawa | B25J 9/1671 |
| 11,061,377 B2* | 7/2021 | Muneta | G05B 19/056 |
| 11,079,925 B2* | 8/2021 | Roper | G06F 3/0486 |
| 11,531,551 B2* | 12/2022 | Onose | G05B 19/05 |
| 11,940,772 B2* | 3/2024 | Sagasaki | G05B 19/402 |
| 11,960,925 B2* | 4/2024 | Mizuno | G06F 9/451 |
| 2002/0026264 A1* | 2/2002 | Choi | G05B 19/414 700/197 |
| 2002/0087232 A1* | 7/2002 | Lapham | B25J 9/1697 700/245 |
| 2003/0023347 A1* | 1/2003 | Konno | G05B 19/0426 700/245 |
| 2004/0210326 A1* | 10/2004 | Muneta | G05B 19/058 700/82 |
| 2005/0097233 A1* | 5/2005 | Oka | G05B 19/054 710/9 |
| 2007/0061041 A1* | 3/2007 | Zweig | G05D 1/0261 700/245 |
| 2012/0016521 A1* | 1/2012 | Lapham | B25J 9/1656 901/10 |
| 2012/0239201 A1* | 9/2012 | Kobayashi | G05B 19/056 700/275 |
| 2012/0239978 A1* | 9/2012 | Narutani | G06F 11/3447 714/E11.178 |
| 2013/0044115 A1* | 2/2013 | Oyama | G05B 19/4068 345/473 |
| 2013/0282176 A1* | 10/2013 | Lapham | B25J 9/161 700/259 |
| 2014/0005835 A1* | 1/2014 | Nishiyama | G05B 19/4145 700/275 |
| 2014/0306642 A1* | 10/2014 | Kaku | H02P 31/00 318/568.1 |
| 2014/0309751 A1* | 10/2014 | Nagata | G05B 19/409 700/12 |
| 2015/0025656 A1* | 1/2015 | Ono | G05B 19/052 700/20 |
| 2015/0032258 A1* | 1/2015 | Passot | G05D 1/0016 700/250 |
| 2015/0190926 A1* | 7/2015 | Miegel | B25J 9/1682 700/248 |
| 2015/0227348 A1* | 8/2015 | Fuchikami | G05B 19/056 717/114 |
| 2016/0124412 A1* | 5/2016 | Fujita | B25J 9/0084 901/6 |
| 2017/0001307 A1* | 1/2017 | Bonnet Des Tuves | B25J 9/1602 |
| 2017/0075331 A1* | 3/2017 | Kapoor | B25J 9/1697 |
| 2017/0075334 A1* | 3/2017 | Yaoita | G06F 9/4843 |
| 2017/0146967 A1* | 5/2017 | Hatanaka | G05B 19/0421 |
| 2019/0009414 A1* | 1/2019 | Lipay | B25J 9/1612 |
| 2019/0030715 A1 | 1/2019 | Tarui | |
| 2019/0079499 A1* | 3/2019 | Yamamoto | G05B 19/41835 |
| 2019/0095246 A1* | 3/2019 | Nakano | G05B 19/052 |
| 2019/0369587 A1* | 12/2019 | Muneta | G05B 19/042 |
| 2019/0389062 A1* | 12/2019 | Truebenbach | B25J 9/1676 |
| 2020/0125060 A1* | 4/2020 | Fujimura | G05B 19/056 |
| 2020/0233553 A1* | 7/2020 | Roper | B25J 9/1687 |
| 2024/0116191 A1* | 4/2024 | Kato | G05B 19/42 |

FOREIGN PATENT DOCUMENTS

| | | |
|---|---|---|
| JP | H05-008186 A | 1/1993 |
| JP | H5274020 A | 10/1993 |
| JP | H06-035528 A | 2/1994 |
| JP | H9167007 A | 6/1997 |
| JP | H10-291183 A | 11/1998 |
| JP | H11-249725 A | 9/1999 |
| JP | 2001-209419 A | 8/2001 |
| JP | 2006-181591 A | 7/2006 |
| JP | 2011-062798 A | 3/2011 |
| JP | 2012166290 A | 9/2012 |
| JP | 201961467 A | 4/2019 |

* cited by examiner

FIG. 5

```
1   // INPUT DATA
2   "plcrobot_ref_req".CMD_ID      := 2;
3   "plcrobot_ref_req".POS.POS[0]  := 1500.5;
4   "plcrobot_ref_req".POS.POS[1]  := 0.0;
5   "plcrobot_ref_req".POS.POS[2]  := 1585.0;
6   "plcrobot_ref_req".POS.POS[3]  := -180.2;
7   "plcrobot_ref_req".POS.POS[4]  := -90.3;
8   "plcrobot_ref_req".POS.POS[5]  := 0.001;
9
10  // COPY DATA TO ROBOT DI AREA
11  #i_intDummy := UBLKMOV(SRCBLK := "plcrobot_ref_req",
12                         DSTBLK => "DI_TEST");
```

71

ROBOT CONTROL DEVICE AND ROBOT SYSTEM

RELATED APPLICATIONS

The present application is a National Phase of International Application No. PCT/JP2021/018279 filed May 13, 2021, which claims priority to Japanese Application No. 2020-086924, filed May 18, 2020.

FIELD

The present invention relates to a robot controller and a robot system that control a robot.

BACKGROUND

It is a common practice to teach a robot, i.e., create a motion program for a robot, using a teach pendant connected to a robot controller in a factory. PTL 1 discloses an automatic program generation apparatus designed to automatically generate teaching data using CAD data of a target workpiece to improve the efficiency of a teaching operation for, e.g., a robot (PTL 1, paragraphs 0005 to 0007).

Regarding creation of an NC program for an NC machine tool, PTL 2 discloses a "numerical control method in which tool offset shape data divided for each machining process and sent from a CAM 200 is received by a high-speed data processing unit 300 via a communication line such as a LAN and temporarily stored in a buffer memory 301, tool path data creation and conversion processing into an NC program based on a designated cutting condition are performed for the tool offset shape data, and the obtained NC program is sent to a machine tool 402 via a numerical control unit 401" (PTL 2, Abstract).

CITATIONS LIST

Patent Literature

[PTL 1] Japanese Unexamined Patent Publication (Kokai) No. H9-167007
[PTL 2] Japanese Unexamined Patent Publication (Kokai) No. H5-274020

SUMMARY

Technical Problem

In a production facility including a robot and a peripheral device, the robot executes a task in accordance with a taught motion program, and the peripheral device is controlled by an external device (e.g., a PLC (Programmable Logic Controller) or a PC (Personal Computer)). A demand has arisen to perform sophisticated operation of the robot even from the external device.

Solution to Problem

One aspect of the present disclosure provides a robot controller that controls a robot, the controller including a digital input-output interface configured to exchange digital data with an external device, a program generation unit configured to generate a motion instruction to the robot in accordance with instruction identification data included in the digital data input via the digital input-output interface, and a program execution unit configured to execute the generated motion instruction.

Another aspect of the present disclosure provides a robot system including a robot, the robot controller, and an external device configured to exchange the digital data with the robot controller.

Advantageous Effects of Invention

With the above-mentioned configuration, sophisticated control of the robot can be performed from the external device.

These and other objects, features, and advantages of the present invention will become more apparent from the following detailed description of an exemplary embodiment thereof, as illustrated in the accompanying drawings, in which:

BRIEF DESCRIPTION OF DRAWINGS

FIG. 5 illustrates an exemplary program, created on the external device, for writing data in a DI area of a robot.

DESCRIPTION OF EMBODIMENTS

Figure 1:
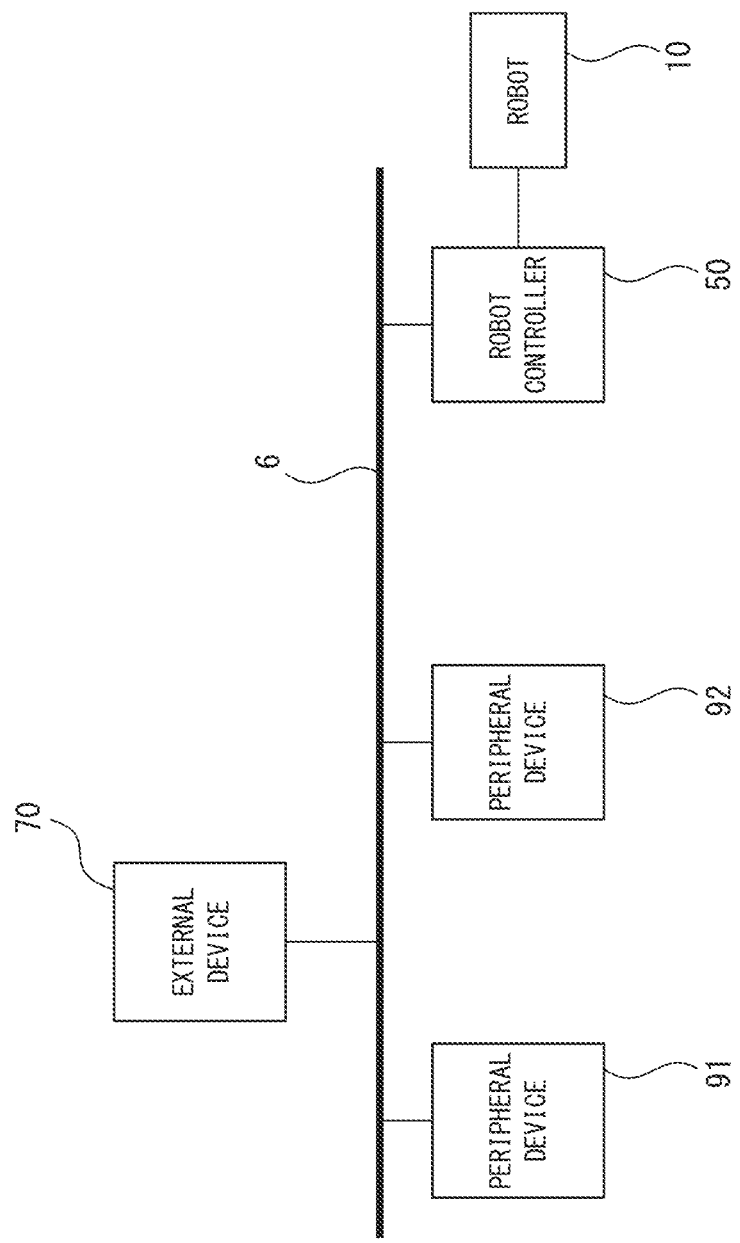
FIG. 1 is a block diagram illustrating an exemplary configuration of network connection between a robot controller and an external device according to one embodiment.

An embodiment of the present disclosure will be described below with reference to the drawings. In the drawings to be referred to, the same or similar reference numerals denote the same or similar components or functional parts. To facilitate understanding, these drawings use different scales as appropriate. Further, the modes illustrated in the drawings are merely examples for carrying out the present invention, which is not limited to the modes illustrated in the drawings.

FIG. 1 is a block diagram illustrating an exemplary configuration of network connection between a robot controller 50 and an external device 70 according to one embodiment. Each device illustrated in FIG. 1 is disposed in a factory and constitutes a production facility. The robot controller 50 controls a robot 10. The external device 70 serves as a controller (e.g., a PLC (Programmable Logic Controller) or a PC (Personal Computer)) that controls peripheral devices 91 and 92. The following description assumes that the external device 70 is implemented as a PLC. The peripheral devices 91 and 92 include various devices such as a workpiece conveyance device, a sensor, a measurement device, and a motor.

As a network 6, various networks can be used, but in this case, the network 6 is implemented as a network based on a fieldbus (field network) standard as an example. The fieldbus refers to a network mainly intended for communication of digital data between a controller and a peripheral device in a factory, and has a relatively high real-time performance. Examples of the fieldbus may include DeviceNet (registered trademark) and PROFIBUS (registered trademark). In the exemplary network configuration illustrated in FIG. 1, the robot controller 50 is connected to the external device 70 as a node equivalent to the peripheral devices 91 and 92.

As the network 6 used for connection between the external device 70 and the robot controller 50, the fieldbus is merely an example, and other networks (e.g., GPIO (General-Purpose Input/Output)) for exchanging digital data may be used. Alternatively, a LAN (Local Area Network) may be used as the network 6. FIG. 1 illustrates connection between the external device 70 and each device as bus connection, but this is merely an example, and the wiring mode is not limited to such a specific example. Each of the external device 70 and the robot controller 50 may have a hardware configuration implemented in a general computer including, e.g., a CPU, a ROM, a RAM, a storage device, an operation unit, a display unit, an input-output interface, and a network interface.

Figure 2:
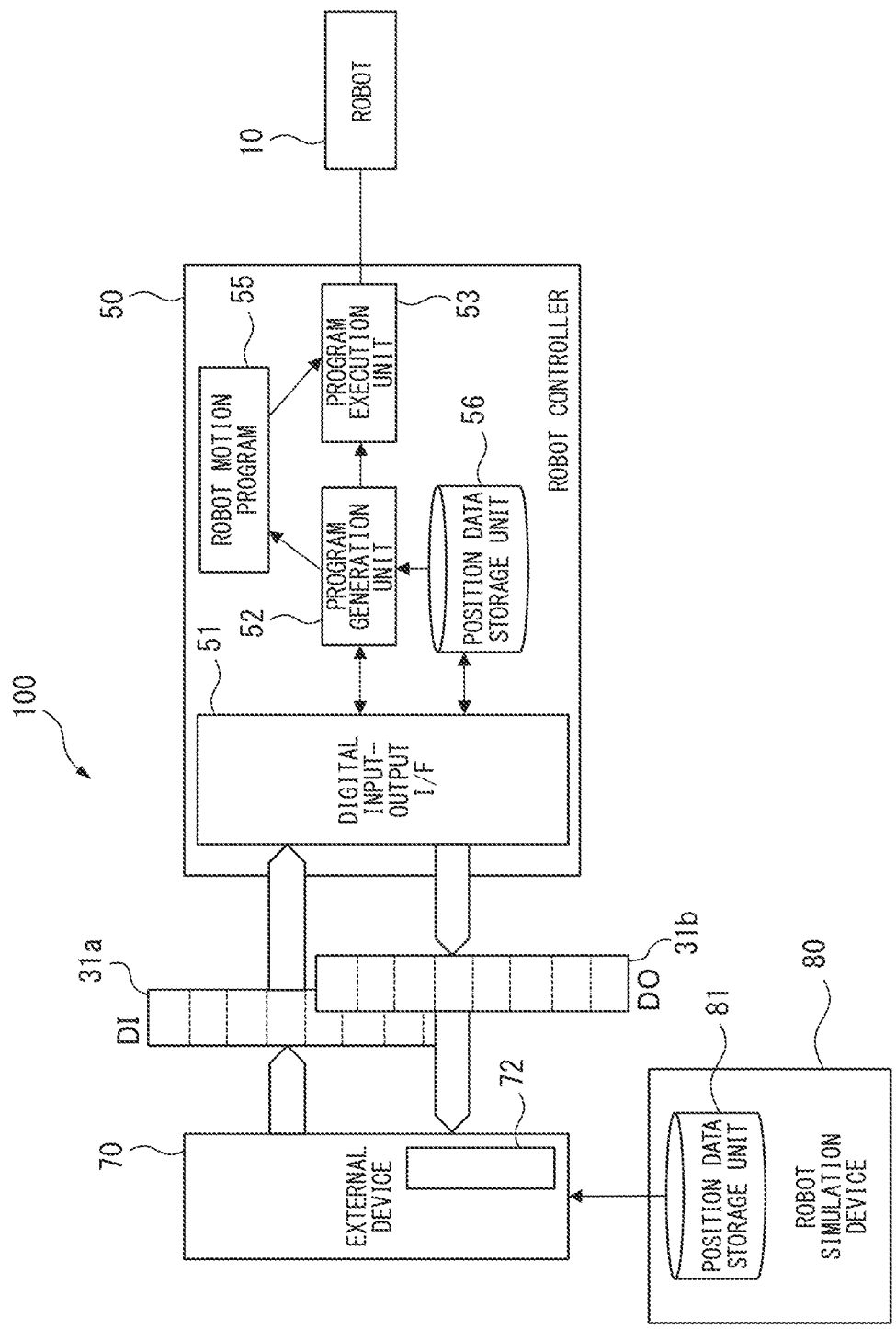
FIG. 2 is a block diagram depicting functional blocks of the robot controller, and representing the connection state between the robot controller and the external device.

FIG. 2 depicts functional blocks of the robot controller 50, and represents the connection state between the robot controller 50 and the external device 70. The robot controller 50 is connected to the external device 70 via a digital input-output interface 51 that functions as a communication interface based on the fieldbus standard, as illustrated in FIG. 2. The external device 70 also includes an interface 72 based on the fieldbus standard. The external device 70 performs sophisticated control of the robot 10 by exchanging, e.g., numerical data representing a command ID with the robot controller 50, as will be described in detail below. A teach pendant (not illustrated) may be connected to the robot controller 50. The robot 10 is implemented as an industrial robot such as a vertical articulated robot or a horizontal articulated robot.

In other words, the external device 70, the robot controller 50, the robot 10, and the peripheral devices 91 and 92 (neither is illustrated in FIG. 2) constitute a robot system 100. The robot system 100 may also include a robot simulation device 80 connected to the external device 70 via a LAN.

The robot controller 50 includes a digital input-output interface 51, a program generation unit 52, and a program execution unit 53, as illustrated in FIG. 2. The digital input-output interface 51 not only has the function of shaping digital data (bit string) received from the external device 70 into data that can be handled by the robot controller 50, but also has the function of outputting, e.g., a response command to the network 6 as digital data. The program generation unit 52 generates a control instruction (i.e., a robot motion program 55) for the robot 10 in accordance with the data (instruction identification data) shaped by the digital input-output interface 51. The program execution unit 53 executes the control instruction (robot motion program 55) generated by the program generation unit 52.

A position data storage unit 56 stores a teaching position (position data) provided in advance by teaching the robot 10. The functional blocks of the robot controller 50 illustrated in FIG. 2 may be implemented by executing various types of software stored in the storage device by the CPU of the robot controller 50, or may be implemented by a configuration mainly formed by hardware such as an ASIC (Application Specific Integrated Circuit).

The external device 70 (interface 72) operates as a master device in the fieldbus. The robot controller 50 operates as a slave device, like the peripheral devices 91 and 92. The external device 70 exchanges digital data with each slave device via a specific memory area (memory-mapped I/O) mapped on a memory map in the CPU of the external device 70. In the fieldbus, such a specific memory area is called a DI area or a DO area. Of such specific memory areas, a memory area for digital data input to the robot controller 50 will be referred to as a "robot DI area" (or simply as a DI area) hereinafter, and a memory area for digital data output from the robot controller 50 and input to the external device 70 will be referred to as a "robot DO area" (or simply as a DO area) hereinafter. The external device 70 accesses the DI/DO areas of the robot in accordance with a control program written in ladder language as an example.

The sequence of robot control by exchange of digital data between the external device 70 and the robot controller 50 will be described below.

(Procedure 1) The external device 70 uses a ladder program to copy a designated command, position data of the robot, and data of, e.g., the motion speed of the robot into the DI area of the robot.

(Procedure 2) The digital input-output interface 51 of the robot controller 50 shapes the data from the external device 70 into data that can be handled by the robot controller 50.

(Procedure 3) The program generation unit 52 of the robot controller 50 generates a motion program for the robot 10 using the shaped data.

(Procedure 4) The program execution unit 53 executes the motion program generated by the program generation unit 52.

Referring to FIG. 2, reference numeral 31a denotes digital data output from the external device 70 (interface 72) by being copied into the DI area of the robot on the memory map in accordance with the ladder program of the external device 70. Reference numeral 31b denotes digital data output from the robot controller 50 (digital input-output interface 51) and written into the DO area of the robot on the memory map of the external device 70.

Figure 3:
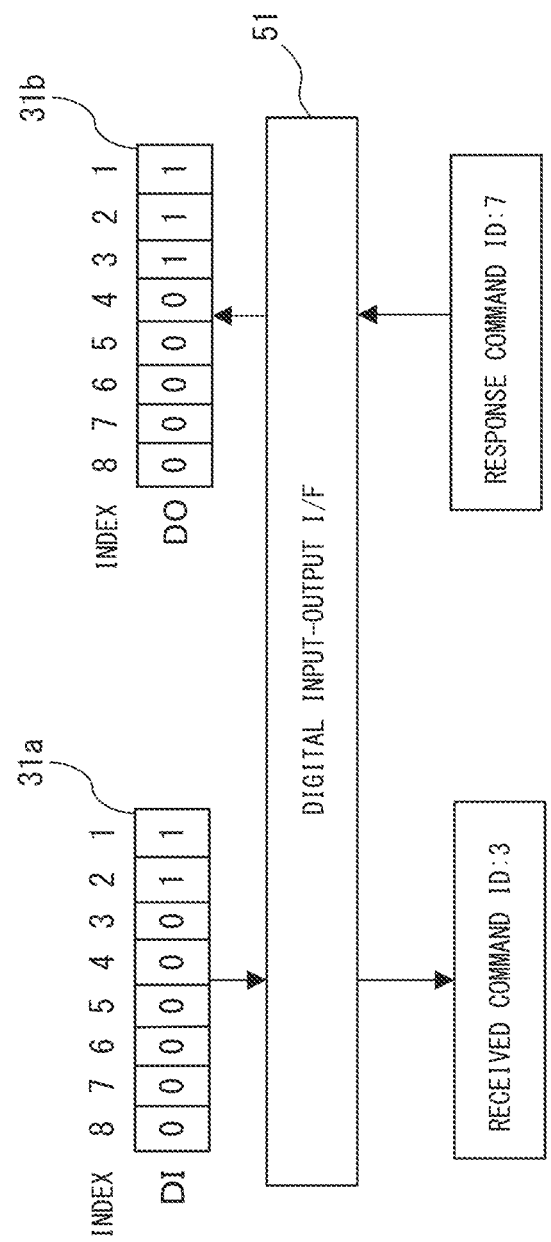
FIG. 3 is a diagram for explaining the function of data shaping in a digital input-output interface.

FIG. 3 is a diagram for explaining the function of data shaping in the digital input-output interface 51. Assume, as an example, that a bit string of 8 bits (index numbers i8 to i1) that starts from index number i1 of the digital data 31a (the data in the DI area of the robot) transmitted from the external device 70 to the robot controller 50 represents a command ID (instruction identification data). When the bit string of the index numbers i8 to i1 of the received digital data 31a is "00000011," the digital input-output interface 51 extracts a numerical value of "3" as the received command ID and passes it to the program generation unit 52.

The case where the robot controller 50 sends, e.g., ID: 7 to the external device 70 as a response command will be described below. The program generation unit 52 passes response command ID: 7 (a numerical value of 7) to the digital input-output interface 51. The digital input-output interface 51 includes a numerical value of "00000111" corresponding to this ID into the position of the index numbers i8 to i1 of the digital data 31b, and transmits the obtained data to the external device 70 as the data in the DO area of the robot. The external device 70 (ladder program) determines that the response command from the robot (robot controller 50) is ID: 7 by reading the bit string of the indexes i8 to i1 of the digital data 31b copied into the DO area of the robot.

The program generation unit 52 may include a correspondence table (table) associating command IDs and instructions with each other. In this case, the program generation unit 52 can determine a statement corresponding to the received command ID by looking up the correspondence table. An example of the correspondence table is illustrated in the following Table 1. The external device 70 may also include a correspondence table associating response command IDs and instruction details from the robot controller 50 with each other.

TABLE 1

| Command ID | Instruction Details |
|---|---|
| 1 | Program Creation |
| 2 | Linear Motion |
| 3 | Joint Motion |
| 4 | Pause |
| 5 | Motion Restart |
| 9 | Status Request of Robot |
| 11 | Position Data Request |

Figure 4:
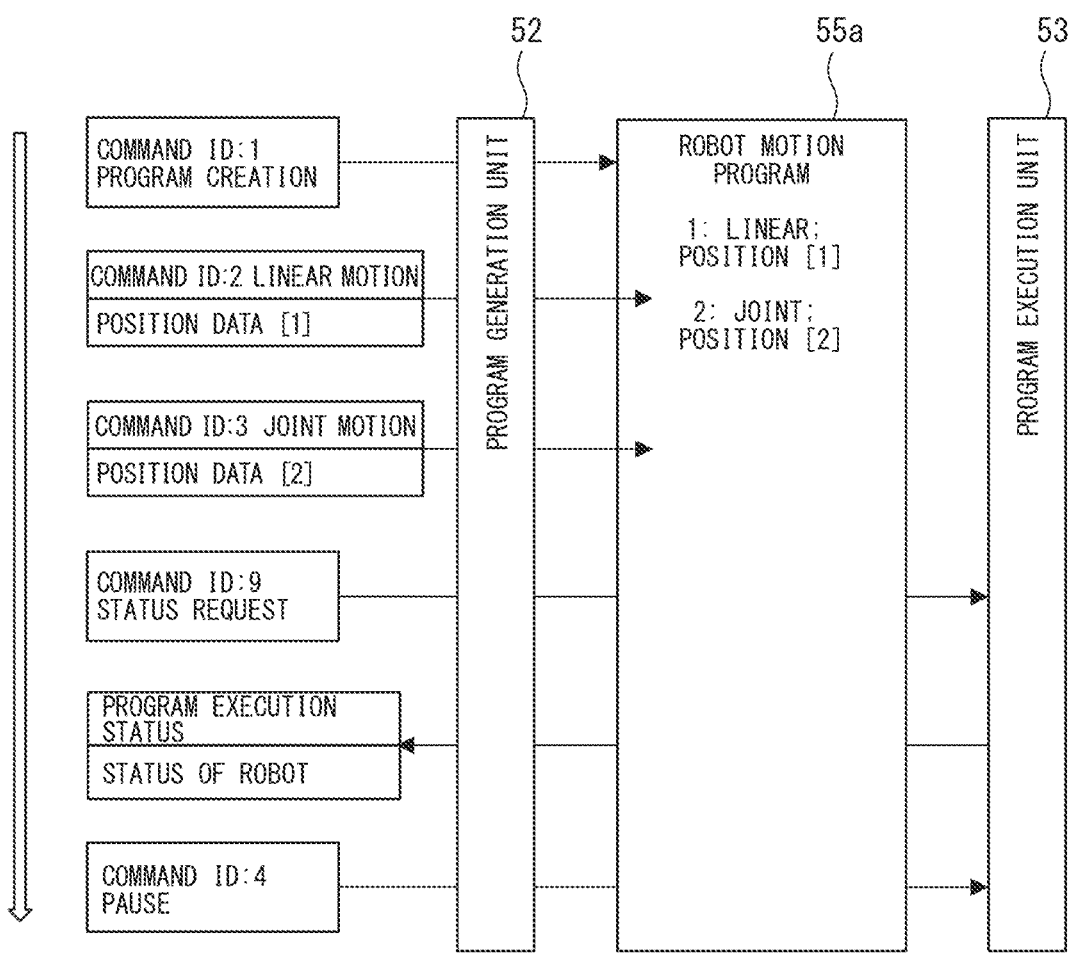
FIG. 4 is a diagram for explaining exemplary execution of robot control in the robot controller.

Exemplary execution of robot control in the robot controller 50 by exchange of data with the external device 70 will be described below with reference to FIG. 4. A motion made when the program generation unit 52 receives command ID: 1, command ID: 2, command ID: 3, command ID: 9, and command ID: 4 in this order from the external device 70 via the digital input-output interface 51 will be taken as an example herein. First, upon receiving command ID: 1, the program generation unit 52 determines that command ID: 1 indicates a program creation instruction by looking up the correspondence table (Table 1), and generates a robot motion program 55*a* with empty content.

Then, upon receiving command ID: 2, the program generation unit 52 determines that command ID: 2 indicates a linear motion instruction by looking up the correspondence table, and further receives position data (position data [1]). Upon receiving position data [1], the program generation unit 52 generates an instruction "linear; position [1]" for moving the arm distal end or end effector of the robot 10 to the position indicated by position data [1], and writes the instruction into the robot motion program 55*a*. When the instruction "linear; position [1]" is written into the robot motion program 55*a*, the program execution unit 53 executes the written instruction "linear; position [1]." In this case, the program execution unit 53 linearly moves the arm end effector of the robot 10 to the position indicated by position data [1], in accordance with the instruction "linear; position [1]." The movement instruction from the external device 70 may further include designation of a motion speed.

The position data sent together with a linear motion instruction or a joint motion instruction is implemented as, e.g., a bit string of 32 bits conforming to floating point form (IEEE 754). In this case, the digital input-output interface 51 converts the received bit string of 32 bits into a floating point numerical value in conformity with IEEE 754.

Upon receiving command ID: 3, the program generation unit 52 determines that this command ID: 3 indicates a joint motion instruction by looking up the correspondence table, and further receives position data (position data [2]). Upon receiving position data [2], the program generation unit 52 generates an instruction "joint; position [2]" for moving the arm end effector of the robot 10 by a joint motion, and writes the instruction into the robot motion program 55*a*. When this instruction is written into the robot motion program 55*a*, the program execution unit 53 executes the written instruction. In this case, the program execution unit 53 moves the arm end effector of the robot 10 to the position indicated by position data [2] by a joint motion.

Upon receiving command ID: 9 for requesting statuses associated with the robot and program execution, the program generation unit 52 transmits the execution status (e.g., in execution or suspended) of the robot motion program, and the status (e.g., the current position and the motion speed) of the robot 10 to the external device 70. In this case, the program generation unit 52 may transmit these types of data together with response command ID: 7.

Upon receiving command ID: 4 indicating an instruction to pause the robot, the program generation unit 52 passes this command ID to the program execution unit 53 to stop the motion instruction in execution.

In this manner, according to this embodiment, sophisticated control of the robot 10 can be performed from the external device 70 such as a PLC.

FIG. 5 illustrates an exemplary program, created on the external device 70 (PLC), for writing data in a DI area of a robot. In this program 71, the variable "CMD.ID" is set to a numerical value of 2 (linear motion instruction) as a command ID, and the variables "POS.POS[0] to POS.POS [5]" are set to three-dimensional coordinate values (1500.5, 0.0, 1585.0) and a posture (−180.2, −90.3, 0.001) as position data. The data of the above-mentioned variables are copied into the robot DI area in accordance with a function UBLKMOV. The ladder program in the external device 70 is defined to include, e.g., executing the above-mentioned function when a predetermined input condition holds (i.e., moving the robot to a predetermined position when a predetermined condition holds) to implement robot control.

The external device 70 may be designed to acquire a teaching position (position data) stored in the robot controller 50, as illustrated in FIG. 2. For example, in acquiring position data, the external device 70 transmits position request command ID: 11 (see Table 1) to the robot controller 50. The robot controller 50 transmits position data to the external device 70 as a response to position request command ID: 11. With such a procedure, the external device 70 can acquire a teaching position (position data) stored in the robot controller 50. This position request command may be associated with a number indicating the number of a teaching position to be requested.

Alternatively, the external device 70 may acquire a teaching position (position data) confirmed to allow a motion involved by the robot simulation device 80 and stored in a position data storage unit 81, and may use it to control the robot 10. Or again, the external device 70 may be designed to input position data via the operation unit of the external device 70.

As described above, in this embodiment, in a fieldbus (field network) mainly intended to connect a controller such as a PLC and a peripheral device to each other and exchange digital data between them, the robot controller 50 is connected to the external device 70 as a node equivalent to the peripheral device. A motion instruction to the robot is transmitted from the external device 70 as a command ID (digital data), and a request of position data and a request of a status can be issued from the external device 70 as a command ID as well. This allows even control based on the status (e.g., the motion speed, the current position and the target position, and in motion or not in motion) of the robot from the external device 70.

Although the present invention has been described above with reference to exemplary embodiments, it will be appreciated by those skilled in the art that the foregoing and various other changes, omissions, or additions may be made to the above-described embodiments without departing from the scope of the invention.

Various types of processing performed by the CPU of the external device or the robot controller, described in the above-described embodiments, can be recorded on various computer-readable recording media (e.g., a ROM, an EEPROM, a semiconductor memory such as a flash memory, a magnetic recording medium, or an optical disk such as a CD-ROM or a DVD-ROM) as programs.

REFERENCE SIGNS LIST

10 Robot
50 Robot controller
51 Digital input-output interface
52 Program generation unit
53 Program execution unit
55, 55a Robot motion program
56 Position data storage unit
70 External device
72 Interface
80 Robot simulation device
81 Position data storage unit
91, 92 Peripheral device
100 Robot system

The invention claimed is:

1. A robot controller configured to control a robot, the robot controller comprising:
a communication interface configured to exchange digital data with a controller; and
a processor configured to
generate a motion instruction to the robot based on instruction identification data and position data of the robot included in the digital data input via the communication interface; and
execute the generated motion instruction.

2. The robot controller according to claim 1, wherein the communication interface is configured to extract the instruction identification data from a bit string located at a position of a predetermined index number in the received digital data.

3. The robot controller according to claim 1, wherein the processor is configured to generate the motion instruction using a table associating the instruction identification data and the motion instruction with each other.

4. The robot controller according to claim 1, wherein the communication interface is based on a fieldbus standard.

5. A robot controller configured to control a robot, the robot controller comprising:
a communication interface configured to exchange digital data with a controller;
a processor configured to
generate a motion instruction to the robot in accordance with instruction identification data included in the digital data input via the communication interface, and
execute the generated motion instruction; and
a memory storing teaching position data of the robot, wherein
the processor is configured to, in response to the instruction identification data serving as an instruction indicating a request of the teaching position data, transmit the teaching position data stored in the memory to the controller via the communication interface.

6. A robot system, comprising:
a robot;
the robot controller according to claim 1; and
a controller configured to exchange the digital data with the robot controller.

7. A robot system, comprising:
a robot;
a robot controller configured to control the robot, and
a controller configured to exchange digital data with the robot controller, wherein
the robot controller includes
a communication interface configured to exchange the digital data with the controller,
a processor configured to
generate a motion instruction to the robot based on instruction identification data included in the digital data input via the communication interface, and
execute the generated motion instruction, and
the controller is configured to
acquire, from a robot simulation device connected to the controller via a network, teaching position data used for a motion instruction to move the robot, and
transmit, to the robot controller, the digital data including the instruction identification data and the teaching position data corresponding to the motion instruction to move the robot.

8. A robot controller configured to control a robot, the robot controller comprising:
a communication interface configured to exchange digital data with a controller; and
a processor configured to
generate a motion instruction to the robot in accordance with instruction identification data included in the digital data input via the communication interface, and
execute the generated motion instruction; wherein
a type of instruction defined by the instruction identification data includes an instruction for moving the robot, a request for position data of the robot, and a request of a status of the robot.

* * * * *